United States Patent [19]
Breese

[11] B 3,996,589
[45] Dec. 7, 1976

[54] MONOPULSE RADAR SYSTEM

[75] Inventor: Maurice Earl Breese, Moorestown, N.J.

[73] Assignee: RCA Corporation, New York, N.Y.

[22] Filed: Aug. 15, 1974

[21] Appl. No.: 497,702

[44] Published under the second Trial Voluntary Protest Program on March 2, 1976 as document No. B 497,702.

Related U.S. Application Data

[63] Continuation-in-part of Ser. No. 317,719, Dec. 22, 1972, abandoned.

[52] U.S. Cl. .................................. 343/8; 343/16 M
[51] Int. Cl.$^2$ ...................... G01S 9/48; G01S 9/22
[58] Field of Search ............................. 343/8, 16 M

[56] References Cited
UNITED STATES PATENTS

| | | | |
|---|---|---|---|
| 2,911,644 | 11/1959 | Stavis | 343/8 |
| 3,102,263 | 8/1963 | Meyer | 343/8 |
| 3,235,865 | 2/1966 | Flower et al. | 343/8 |
| 3,423,752 | 1/1969 | Schwartz | 343/8 |
| 3,430,236 | 2/1969 | Gamertsfelder | 343/8 X |
| 3,708,794 | 1/1973 | Van Popta | 343/16 M X |

OTHER PUBLICATIONS

"Null Tracking Doppler-Navigation Radar" by P. G. Smith, IEEE, Mar. 1963, Transactions on Aerospace and Navigational Electronics, pp. 50-64.

Primary Examiner—Malcolm F. Hubler
Attorney, Agent, or Firm—George J. Seligsohn; Edward J. Norton

[57] ABSTRACT

Structure, such as a variable coupler, is employed to effectively rotate monopulse beam components through any given angle about the monopulse antenna axis. Useful in an airborne velocity measuring doppler radar, where servo means control the value of the given angle so that the rotated beam components are maintained properly aligned with an isodop, despite aircraft drift.

4 Claims, 11 Drawing Figures

*PRIOR ART NO DRIFT*

PRIOR ART DRIFT

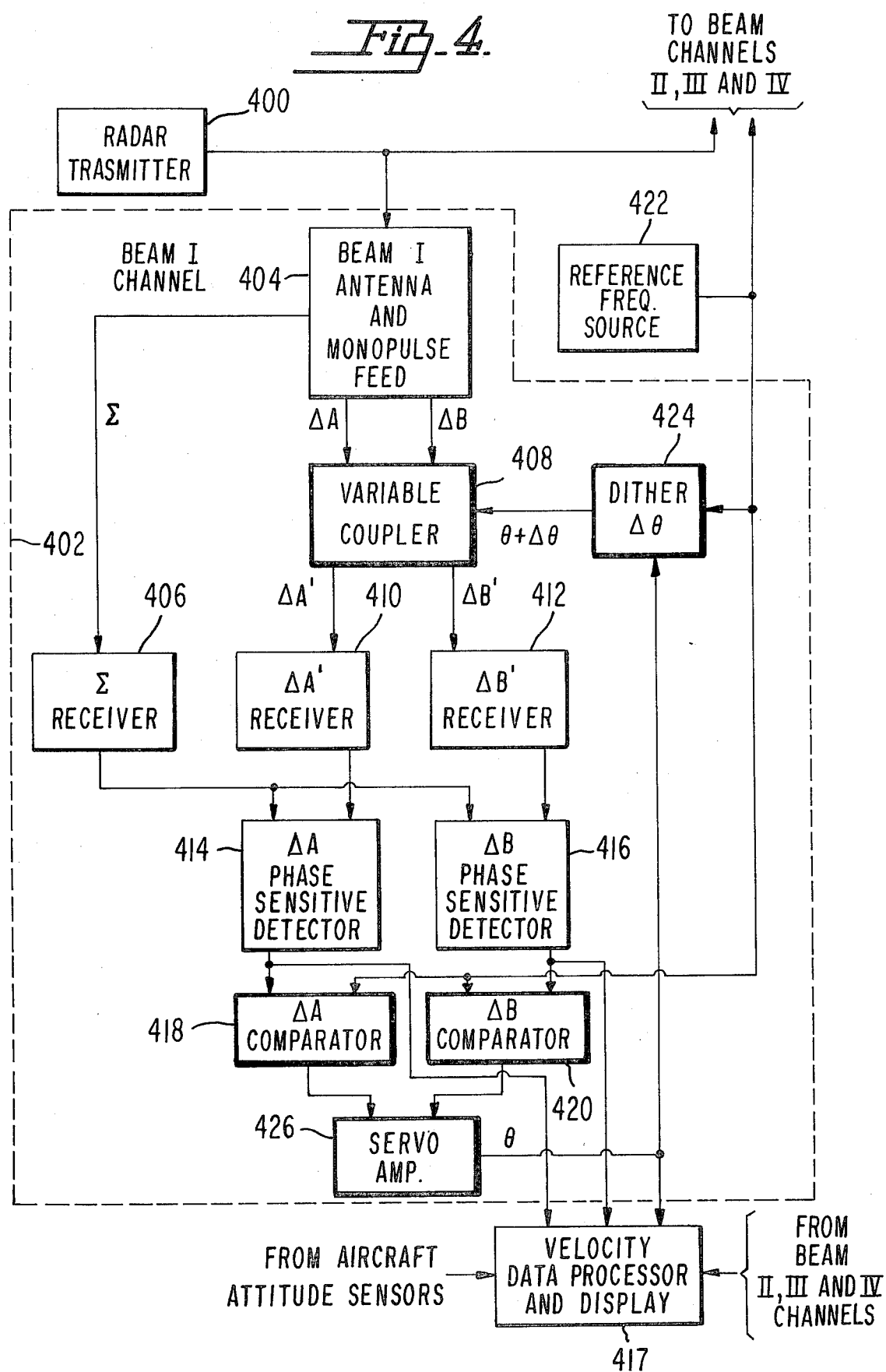

NO DRIFT

DRIFT

MONOPULSE RADAR SYSTEM

This is a continuation-in-part of application Ser. No. 317,719, filed Dec. 22, 1972, now abandoned.

This invention relates to a monopulse radar system and, more particularly, to an improved monopulse radar system suitable for use as an airborne velocity-measuring doppler radar.

As is known, the antenna of a monopulse radar effectively employs a plurality (usually four) of spaced feeds symmetrically disposed about the antenna axis. When used for transmission, the plurality of feeds are simultaneously pulsed to simultaneously produce a separate component lobe pattern from each respective feed. The sum of the component lobe patterns is an axial beam having an effective width smaller than that which would be obtained from the same antenna employing only a single axially-disposed feed. Furthermore, when operating as a receiving antenna, the respective signals picked up by each of the plurality of feeds may be combined in different ways to provide more information than would be obtainable from an antenna employing only a single axially-disposed feed. By way of example, in a tracking radar, difference signals among predetermined combinations of the various feeds may be employed to derive vertical and horizontal error signals in the pointing of the monopulse antenna with respect to a moving target. The error signals may then be employed in a servo system to cause the antenna to track the moving target.

As is known, an alternative to a monopulse, or simultaneous lobing, radar system is a sequential lobe-switching radar system. In this case, only a single, off-axis lobe is transmitted in response to each of a sequence of pulses. However, between successive pulses the direction of the lobe with respect to the axis is switched to provide equal and opposite axis-off-set angles between two successive transmitted beams. If the antenna is pointed directly toward a moving target, the amplitude of the received echo signals will be the same for successive pulses. Otherwise, the difference in received signal strength between successive pulses is an indication of the error in the pointing of the antenna toward the moving target.

The simultaneous lobing of a monopulse radar system is superior to the sequential lobing system because its sampling interval is shorter and, more important, the clutter return of the monopulse system will be more highly correlated over the sampling interval than that from the sequentially lobing system. On the other hand, a monopulse radar system is more complex and expensive than a simultaneous lobing system.

As is known, airborne doppler radar systems have been developed for measuring both horizontal velocity components of an aircraft, i.e., ground speed and drift angle, and the vertical velocity component of the aircraft, i.e. rate of climb. To completely determine the total velocity vector, composed of three independent components, it is necessary to employ at least three separate radar beams arranged in a predetermined non-coplanar geometric relationship with respect to the three orthogonal axes of the aircraft.

A typical airborne doppler velocity-measuring radar consists of four major subsystems, which are the antenna subsystem, the radar transmitter, the receiving subsystem and the signal processor. The antenna system, in response to each pulse of electromagnetic energy applied thereto by the radar transmitter, transmits the aforesaid beams to the ground and receives doppler shifted reflections therefrom, which are applied to the receiving system. The receiving system derives a relatively broad-band doppler spectrum for each beam which is then processed by the signal processor which estimates the central frequency of each doppler spectrum.

A relatively broad-band doppler spectrum results from the fact that the doppler frequency shift for each radar beam, besides being directly proportional to the aircraft velocity vector and inversely proportional to the wavelength of the electromagnetic energy of the radar beam, is directly proportional to the cosine of the angle between the aircraft velocity vector and the direction of propagation of that radar beam. Since a radar beam has finite width, this angle does not have a single value, but includes all values within the solid angle subtended by the illuminated spot of ground from which scattered return signals are being received. The size of the illuminated spot (and hence the bandwidth of the doppler spectrum) depends on the cross sectional area of the transmitted radar beam and the attitude and altitude of the aircraft. Since water scatters electromagnetic energy to a much greater extent than does land, it is necessary to either illuminate a sufficiently large spot of water, which increases the bandwidth of the doppler spectrum, and/or employ a sufficiently large amount of radiated power in the radar beam over water (the latter usually being impractical) in order to insure that the intensity of the return signal picked up by the antenna is sufficiently high to be detected.

Since the precision of an aircraft velocity-measuring doppler radar is adversely affected by the bandwidth of the doppler spectrum, it is beneficial that such a doppler radar employ techniques for effectively "sharpening" the doppler spectrum which is processed.

In order to obtain a narrow doppler spectrum, it is desirable that all transmitted radar beams be pencil beams. Because lobe-switching antennas and monopulse antennas produce effective beams of narrow widths, they can be used as radar pencil-beam transmitting antennas. However, since airborne velocity-measuring doppler antennas preferably are non-tracking and fixedly mounted to the aircraft, the use of such antennas to obtain a narrow transmitted radar beam would not be justified for this reason alone, since there are other types of pencil beam antennas which are simpler and less costly. However, separate and different techniques have been developed in the prior art, employing respectively a lobe-switching antenna and a monopulse antenna, which attempt to increase the precision with which the central doppler shift frequency can be ascertained.

The lobe-switching technique, which may employ fixedly-mounted antennas, produces an effective beam narrow in width without an increase in antenna size. In this technique two antenna beams, which produce doppler spectra having large slopes at their crossover points, are switched by a small amount in their angular direction at a relatively slow rate, e.g. 20 Hz. Measurement of the central frequency is accomplished by placing a narrow filter at the point where the two spectra cross over. This technique has been proven effective in reducing the so-called overwater calibration shift error which is due to change in scattering coefficient with incidence angles which are different for land and sea.

Since the effective beam width is reduced, the error in measurement in velocity is considerably reduced. The disadvantage of this technique is that, since it is a sequential lobing system, the clutter return will not be as highly correlated over the sampling interval as one from a simultaneously lobing system. Also, over the earth's surface (both sea and land) there will be an assymetry in the doppler spectra for both the sum and difference pattern. Normalization of the difference pattern with respect to the sum pattern, practical only in a monopulse system, will remove this assymetry so that these biases will not exist.

A monopulse beam technique, employing non-fixedly mounted track-stabilized antennas, is disclosed in the article "Null Tracking Doppler-Navigation Radar" by P. G. Smith, which appeared in the *IEEE Transactions on Aerospace and Navigational Electronics* of March 1963. In this case, it is assumed that the horizontal projection of the antenna axis is maintained in coincidence with the ground track and that the null plane of the monopulse beams is oriented along a certain so-called isodop (a hyperbolic line defined by all points on the ground which produce the same given doppler shift frequency). This results in the doppler spectra having large slopes at their crossover points. In order that the doppler spectrum be produced which has a sharp null at the crossover point, it is necessary that the null plane be oriented substantially parallel to the isodop lines. If the null plane should deviate from this parallel condition, no isodop will exist from which zero return is obtained and degradation of the null depth in the difference pattern would then occur.

The fixed parameters of fixedly-mounted, non-tracking, doppler aircraft antennas are more stable and hence such antennas are capable of providing more precision in the measurement of velocity than tracking antennas. However, in the case of non-tracking antennas, a projection of the antenna axes on the ground will be parallel to an isodop only in the absence of any drift or yaw components of aircraft velocity. In particular, the presence of any aircraft drift velocity component or yaw component results in a deviation from the required parallel condition, and hence a degradation of the null depth of the monopulse difference pattern. Since in practice, an aircraft yaws from time to time and often has a significant component of drift velocity, the prior art monopulse beam technique, discussed above, is of little practical significance for fixedly-mounted, non-tracking doppler antennas.

In accordance with the present invention, means are provided for effectively rotating the angular position of the null plane. Therefore, the null plane may be oriented to be parallel to an isodop. This rotation, which may be achieved automatically with servo means, makes it possible to employ a fixedly-mounted antenna (rather than a track-stabilized antenna) and makes the position of the null plane independent of either drift velocity or the attitude of the aircraft. The "beam sharpening" obtainable with this approach permits an improvement of as much as ten to one in the precision of velocity measurement with respect to that obtainable with conventional non-null plane type, fixedly-mounted, doppler radar antenna systems.

These and other features and advantages of the present invention will become more apparent from the following detailed description taken together with the accompanying drawing, in which.

Figure 2:
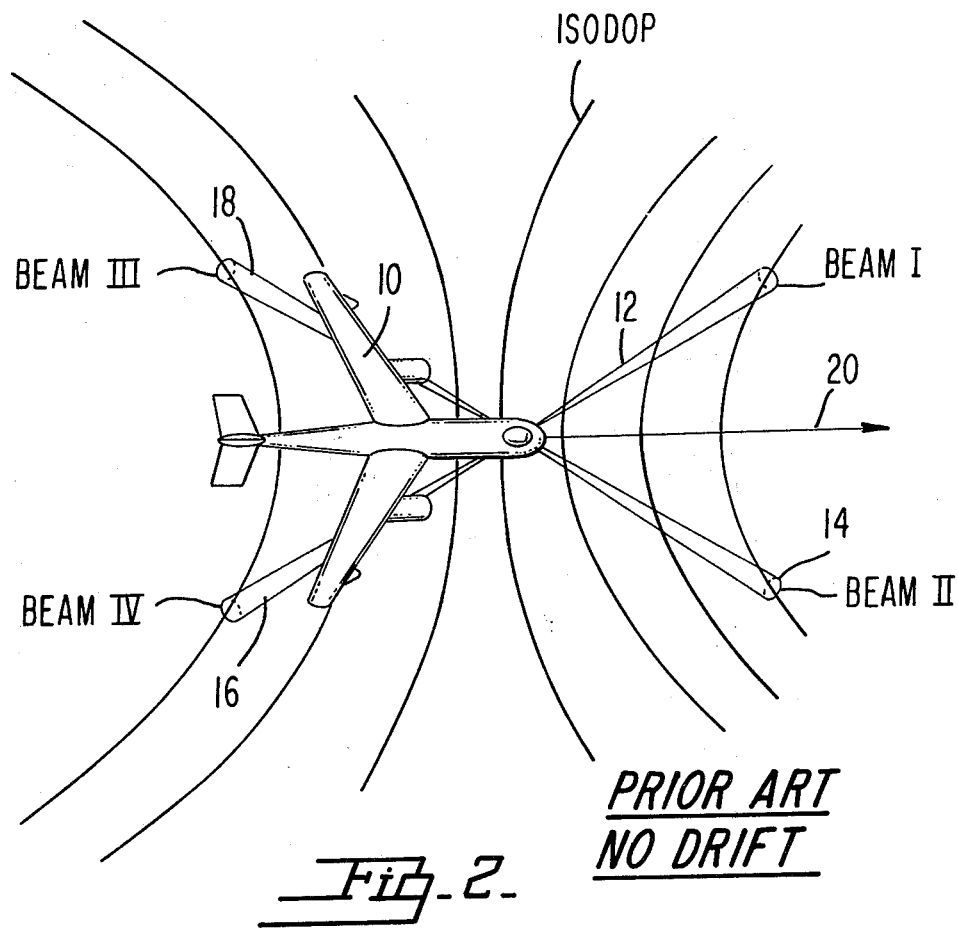
FIG. 2 is a plan view showing the isodop pattern generated by the doppler system configuration of FIG. 1 under "no drift" flying conditions.
Figure 3:
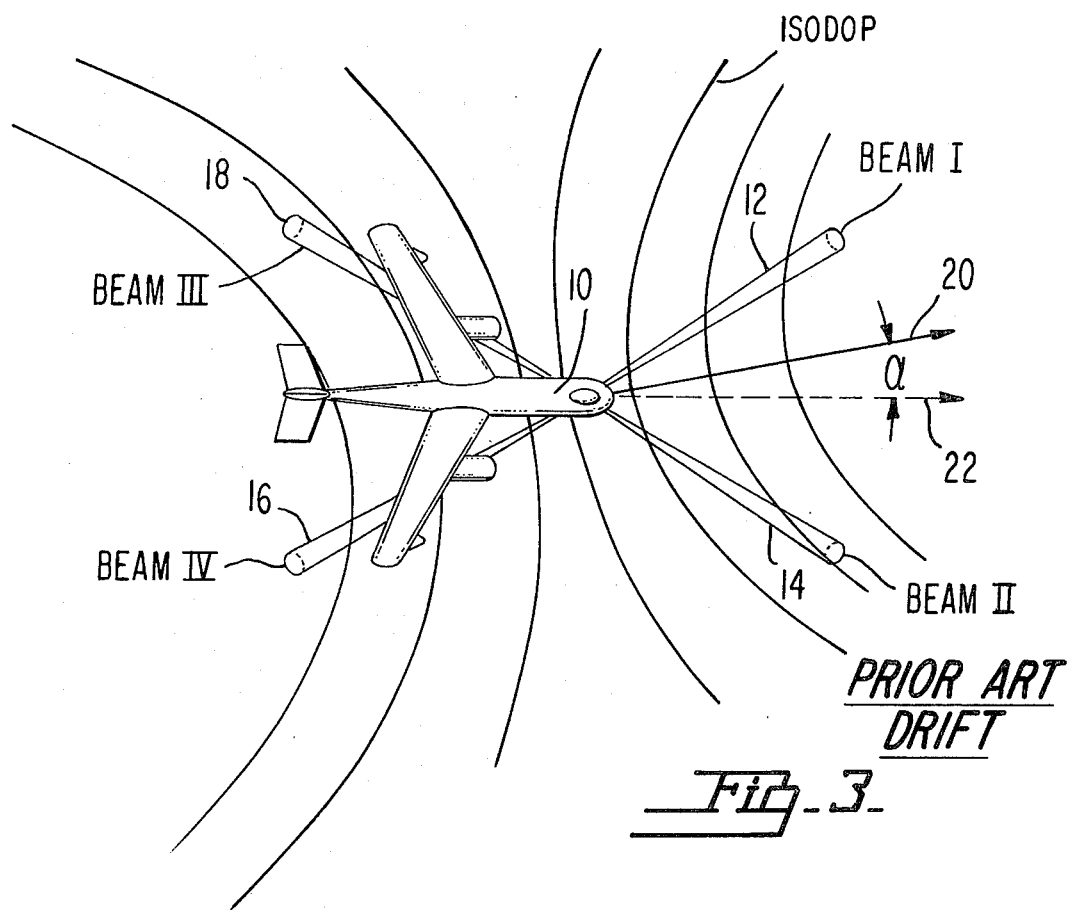
Figure 5:
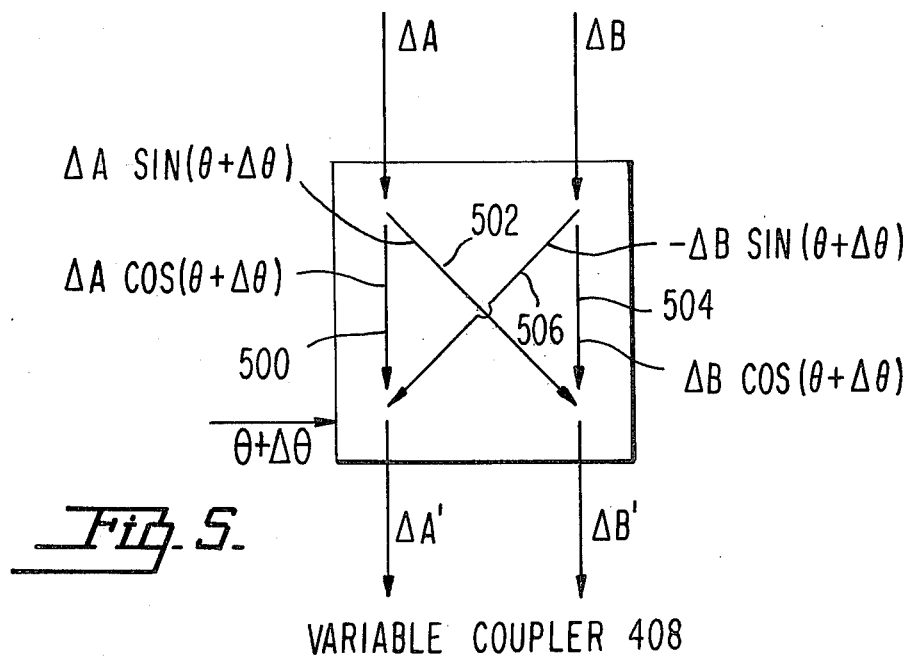
Figure 6:
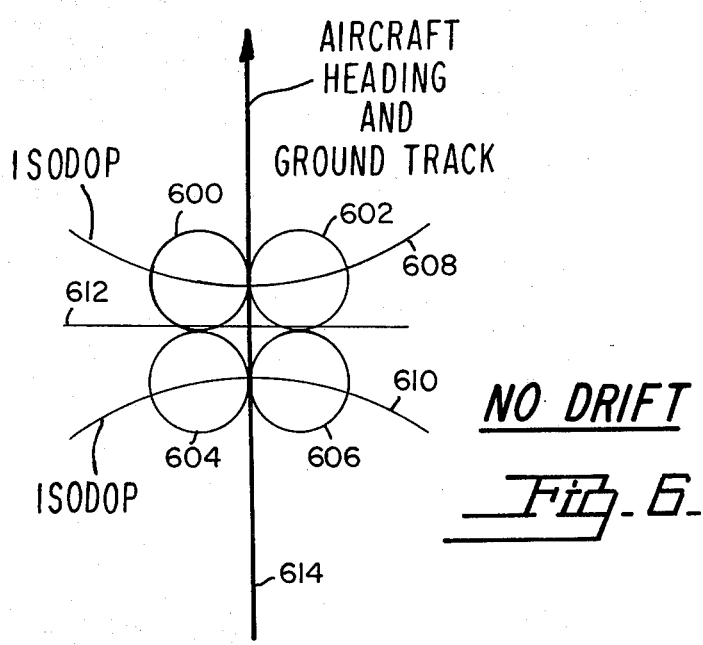
Figure 7:
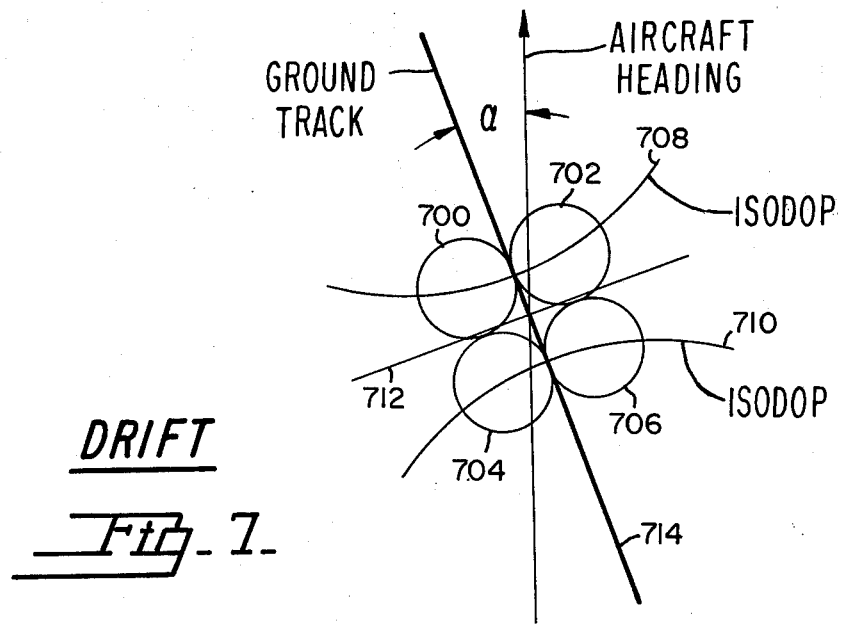
Figure 8:
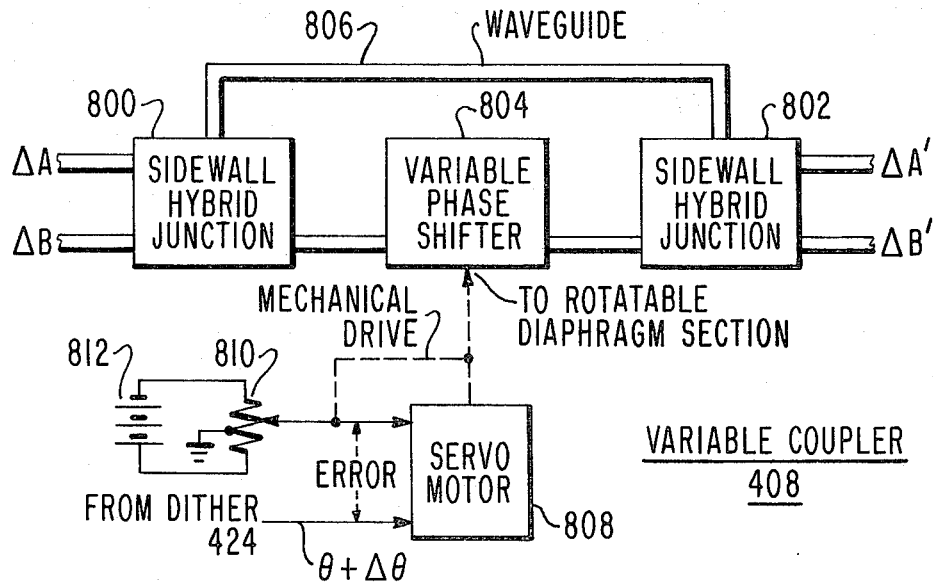
Figure 9:
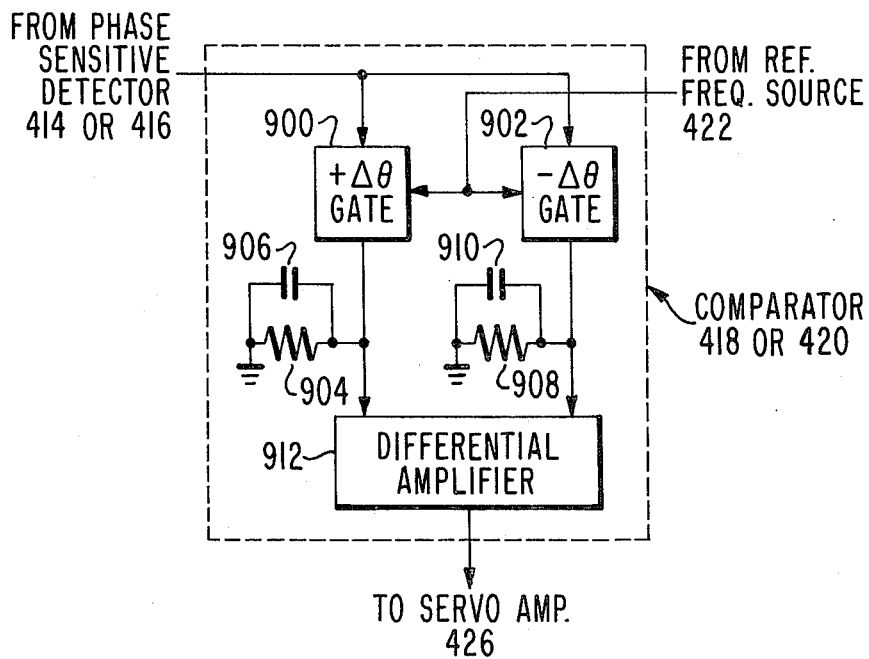
Figure 10:
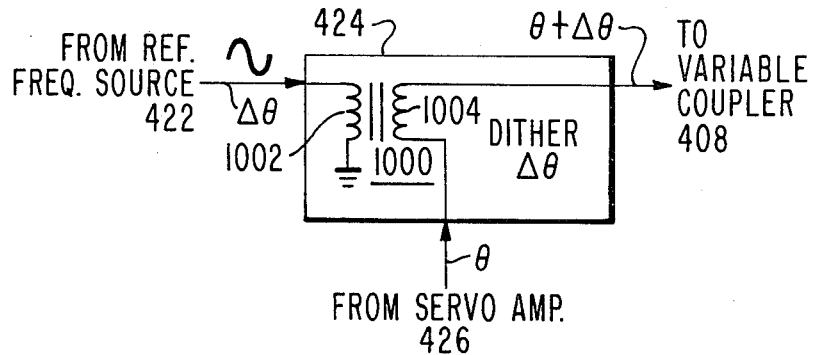
Figure 11:
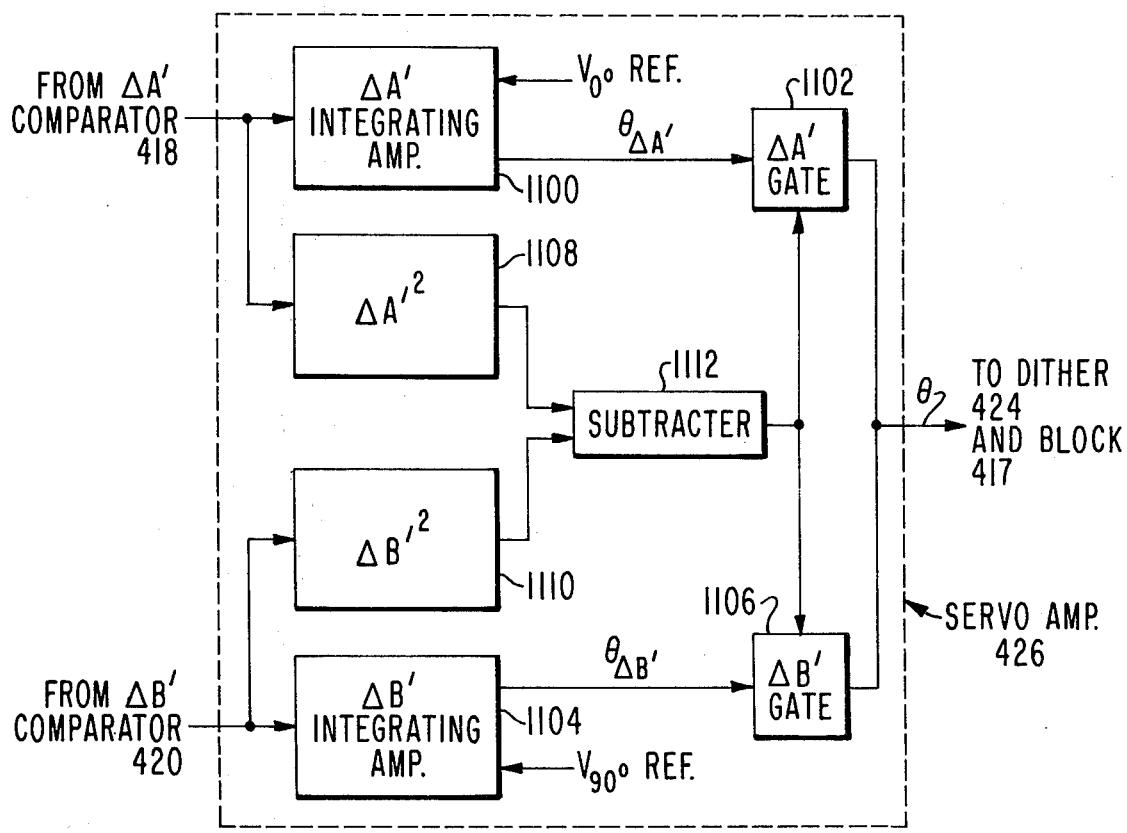

FIG. 3, otherwise similar to FIG. 2, shows the isodop pattern under "drift" flying conditions;

FIG. 4 is a block diagram of a doppler system embodying the present invention;

FIG. 5 is a schematic diagram of the variable coupler of FIG. 4;

FIG. 6 is a diagram helpful in explaining the operation of the doppler system of FIG. 4 under "no drift" flying conditions;

FIG. 7 is a diagram helpful in explaining the operation of the doppler system of FIG. 4 under "drift" flying conditions;

FIG. 8 shows an example of a structural embodiment of the variable coupler of FIG. 4, shown schematically in FIG. 5;

FIG. 9 shows an example of a structural embodiment of either comparator 418 or comparator 420 of FIG. 4;

FIG. 10 shows an example of a structural embodiment of dither $\Delta\theta$ circuit 424 of FIG. 4, and FIG. 11 shows an example of a structural embodiment of servo amplifier 426 of FIG. 4.

Figure 1:
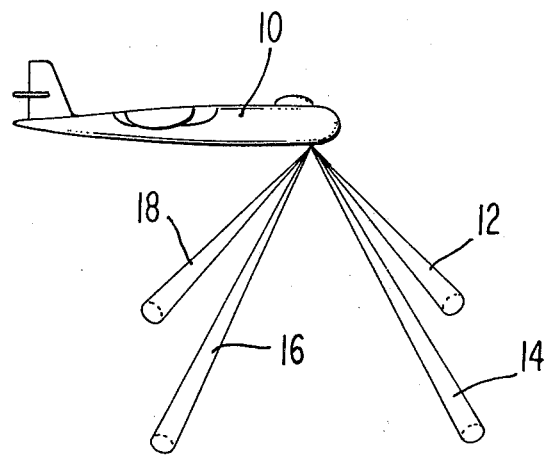
FIG. 1 illustrates an aircraft employing a Janus-X four-beam doppler system configuration.

Although only the three non-coplanar beams are essential to an airborne ground velocity component doppler radar system, the Janus-X-four-beam arrangement, shown in FIG. 1 and known in the prior art, is desirable because of its symmetry and the redundancy which it provides. As specifically shown in FIG. 1, aircraft 10 transmits four angularly-separated pencil beams 12, 14, 16 and 18 toward the ground and receives reflections therefrom. The respective pairs of beams 12 and 14, and beams 16 and 18 are symmetrically disposed in front of and to the rear of a plane defined by the vertical and transverse axes of aircraft 10. In a similar manner, the respective pairs of beams 12 and 18, and beams 14 and 16 are symmetrically disposed to the left of and to the right of the plane defined by the longitudinal and vertical axes of aircraft 10. The plan view shown in each of FIGS. 2 and 3 illustrates the symmetrical arrangement of beams 12, 14, 16 and 18 with respect to the transverse and longitudinal axes of aircraft 10.

As is known in the prior art, under the "no drift" conditions shown in FIG. 2, where ground-track 20 of aircraft 10 coincides with heading of aircraft 10, the pattern of isodops (lines of equal doppler frequency shift) are symmetrically disposed with respect to both the longitudinal and transverse axes of aircraft 10. Therefore, each of the pair of forward beams 12 and 14 (hereinafter referred to as beam I and beam II) will lie on the same isodop as each other and each of the pair of rear beams 16 and 18 (hereinafter referred to as beam IV and beam III) also will lie on the same isodop as each other. Furthermore, the value of the particular isodop that beams III and IV lie on will be substantially equal and opposite to the value of the particular isodop which beams I and II lie on.

As is also known in the prior art, under the aircraft "drift" conditions shown in FIG. 3, the isodop pattern remains symmetrical with respect to ground track 20, but ground track 20 no longer coincides with heading 22 of aircraft 10. Therefore, as shown in FIG. 3, each of beams I, II, III and IV no longer intersect the same or corresponding isodops, as was the case under the "no drift" conditions of FIG. 2. Instead, ground track 20 and the isodop pattern are rotated by a drift angle $\alpha$ with respect to aircraft heading 22; the value of drift angle α being equal to the arc tangent of the ratio of the drift velocity of aircraft 10 to the forward velocity thereof. It is this rotation of the isodop pattern which limits the aforesaid "Null Tracking Doppler-Navigation Radar," of P. G. Smith, described in the *IEEE Transactions on Aerospace and Navigational Electronics* in March 1963, which employs monopulse beam techniques, to the case where the drift angle α is small or, alternatively, the case where the monopulse antenna for each of the beams is ground-track stabilized.

The present invention, by providing a technique for effectively rotating each of the four beams about its own axis makes it possible to extend monopulse beam techniques to doppler navigation radars in which the drift angle is relatively large, but yet still employ fixedly-mounted non-ground-track-stabilized antennas. Such a doppler-navigation radar is shown in FIG. 4.

All the blocks in FIG. 4 shown in relatively light outline are conventional elements of monopulse and/or doppler radar systems. All blocks of FIG. 4 shown in relatively heavy outline are elements incorporated in the radar system for the specific purpose of embodying the present invention.

As shown in FIG. 4, a stream of pulses is applied from radar transmitter 400 to beam I channel 402, shown in detail in FIG. 4, as well as to respective beam channels II, III and IV, not shown in FIG. 4, which are identical in all material respects to beam I channel.

Beam I channel includes beam I antenna and monopulse feed 404 to which the stream of pulses from radar transmitter 400 is applied. Although element 404 may employ the same single antenna for both transmitting and receiving, preferably element 404 includes separate transmitting and receiving antennas which have substantially coincident far-field patterns. Physically both of these antennas may be fixedly-mounted, printed-circuit phased arrays, which are substantially flush with the skin of the aircraft. The transmitting antenna may be any array which forms a properly-directed pencil beam. However, the receiving antenna must be a monopulse beam antenna.

As is known in the art, a monopulse beam antenna comprises a plurality of feeds symmetrically disposed about the antenna axis for simultaneously picking up the respective signal from each member of a set of discrete spaced electromagnetic beam components disposed substantially symmetrically about the antenna axis. Conventionally, this set includes four beam components spatially distributed about the axis in the form of a square. The monopulse antenna includes means associated with the monopulse feed for obtaining various predetermined sum and difference signals of the respective picked-up signals. Specifically, in the case where the set includes four beam components spatially distributed about the axis in the form of a square, all four picked up signals are added to provide a summation signal corresponding to a single resultant axial beam. Further, a first difference signal is derived which is equal to the difference between the sum of a pair of picked-up signals corresponding to a first side of the square and the sum of a pair of the picked-up signals corresponding to a second side of the square situated opposite the first side thereof. Further derived is a second difference signal equal to the difference between the sum of a pair of picked-up signals corresponding to a third side of the square situated perpendicular to the first side thereof and the sum of a pair of picked-up signals corresponding to a fourth side of a square situated opposite the third side thereof. The generation of such summation and first and second difference signals, still in the form of electromagnetic energy waves, is well-known in the monopulse radar art.

The summation signal and the first and second difference signals, respectively designated by the symbols $\Sigma$, $\Delta A$ and $\Delta B$, derived by beam I antenna and monopulse feed 404 are applied respectively as an input to summation receiver 406 and as first and second inputs to variable coupler 408. As shown, variable coupler 408 has a third signal input thereto which manifests the instantaneous value of an angle equal to $\theta + \Delta\theta$.

A schematic diagram of variable coupler 408 is shown in FIG. 5. As known in the art, a variable coupler of the type shown in FIG. 5 may be a waveguide or other functionally equivalent transmission line device, such as structurally shown in FIG. 8 by way of example, for dividing the electromagnetic energy in each of one or more inputs applied thereto into a plurality of separate outputs, with the relative portion of each input applied to each of the respective outputs being variable and controllable. In the particular variable coupler shown in FIG. 5, the electromagnetic energy applied as the first input $\Delta A$ is divided into a first portion 500, which contributes to a first output $\Delta A'$, and the remaining portion 502, which contributes to a second output $\Delta B'$. The electromagnetic energy of the second input $\Delta B$ is divided into a first portion 504, which contributes to a second output $\Delta B'$, and the remaining portion 506, which contributes to the first output $\Delta A'$. As known in the art, the relative portions of first input $\Delta A$ electromagnetic energy which respectively take each of paths 500, and 502 may be controlled by such means as signal-controlled mechanically rotatable diaphragm means (FIG. 8, described below) or signal-controlled gyromagnetic means. In a similar manner, the relative portions of second input $\Delta B$ electromagnetic energy which respectively takes each of paths 504 and 506 may be controlled. This signal control, which is determined by the then existing value of the third input to variable coupler 408, is such that the amplitude of the signal taking path 500 is $\Delta A \cos(\theta + \Delta\theta)$; the amplitude of the signal taking path 502 is $\Delta A \sin(\theta + \Delta\theta)$; the amplitude of the signal taking path 504 is $\Delta B \cos(\theta + \Delta\theta)$, and the amplitude of the signal taking path 506 is $-\Delta B \sin(\theta + \Delta\theta)$. Thus the following transformation function equations specify the relationship between the first output $\Delta A'$ and the second output $\Delta B'$ from variable coupler 408 and the respective inputs thereto.

1. $\Delta A' = \Delta A \cos(\theta+\Delta\theta) - \Delta B \sin(\theta+\Delta\theta)$
2. $\Delta B' = \Delta A \sin(\theta+\Delta\theta) + \Delta B \cos(\theta+\Delta\theta)$ As is known from analytical geometry, equations (1) and (2) are transformation functions which manifest the rotation of cartesian coordinates through a given angle equal to $\theta + \Delta\theta$.

Returning to FIG. 4, the first output $\Delta A'$ from variable coupler 408 is applied as an input to $\Delta A'$ receiver 410 and the second output $\Delta B'$ therefrom is applied as an input to $\Delta B'$ receiver 412. As shown, the output from $\Sigma$ receiver 406 is applied as a first input to both $\Delta A'$ phase sensitive detector 414 and $\Delta B'$ phase sensitive detector 416, while the output from $\Delta A'$ receiver 410 is applied as a second input to $\Delta A'$ sensitive detector 414 and the output from $\Delta B'$ receiver 412 is applied as second input to $\Delta B'$ phase sensitive detector 416.

Receivers 406, 410 and 412 and detectors 414 and 416 are conventionally employed in doppler radar systems for obtaining two normalized signals manifesting respectively the abscissa and ordinate velocity components of the aircraft with respect to certain cartesian coordinate axes. In particular, because of the presence of variable coupler 408, the respective outputs of detectors 414 and 416, which are porportional to the product of the cosine of the first input signal thereto from summation receiver 406 and the sine of the second signal input thereto from the appropriate one of difference receivers 410 and 412, provide respective output signals manifesting the velocity components with respect to a (A', B') cartesian coordinate system, rather than an (A, B) cartesian coordinate system.

As is conventional, the respective outputs of the phase sensitive detectors of beam I channel 404, as well as the corresponding outputs of the phase sensitive detectors from the beam II, III and IV channels are applied as respective inputs to velocity data processor and display 417, to be discussed in more detail below.

However, for the purposes of the present invention, the output of ΔA' phase sensitive detector 414 is also applied as a first input to ΔA' comparator 418 and the output of ΔB' phase sensitive detector 416 is also applied as a first input to ΔB' comparator 420. (A structural example of such a comparator as 418 or 420 is shown in FIG. 9.) A relatively low frequency timing signal, such as 20 Hz, from reference frequency source 422 is applied as a second input to comparators 419 and 420, as well as being also applied as a first input to dither circuit 424. (A structural example of dither circuit 424 is shown in FIG. 11.) This same timing signal, in addition, is applied to the corresponding elements of each of beam channels II, III and IV. The functions performed by comparators 418 and 420 will be discussed below.

The output from comparator 418 is applied as a first input to servo amplifier 426 and the output from comparator 420 is applied as a second input to servo amplifier 426. (A structural example of servo amplifier 426 is shown in FIG. 11.) The output of servo amplifier 426, which manifests the value of the angle θ, is varied in accordance with the algebraic difference between the two inputs to servo amplifier 426 in a direction which, as will be explained below, tends to reduce this difference to a minimum.

The output of servo amplifier 426 of beam I channel 402 is applied as an input to velocity data processor and display 417. In addition, corresponding output signals from the servo amplifiers of beams II, III and IV channels are also applied as inputs to velocity data processor and display 417. Also, the velocity data processor and display 417 receives signals from aircraft attitude sensors aboard the aircraft, not shown.

For the purpose of the present invention, the output of servo amplifier 426 is applied as a second input to dither circuit 424. Dither circuit 424 provides an output signal having a mean amplitude proportional to the value of θ which is periodically varying a given small amount above and below this mean amplitude at a rate equal to that of the timing frequency from reference frequency source 422 applied as a first input thereto. As shown in FIG. 4, the output from dither circuit 424 is applied as the third input to variable coupler 408, discussed above.

Considering now the operation of the system shown in FIG. 4, radar transmitter 400, as is conventional, simultaneously causes the transmission of beams I, II, III and IV, which result in reflections from the ground for each respective beam being received by the monopulse antenna corresponding to that beam. Due to the relative motion of the transmitted beam with respect to the ground, each of the summation and A and B difference signals appearing as separate outputs from the monopulse feed exhibit doppler spectrums. Under "no drift" conditions, shown in FIG. 2 and FIG. 6, the aircraft heading and ground track will coincide and the four monopulse beam components, 600, 602, 604 and 606 will define a square which is symmetrically oriented with the isodop pattern made up of isodops such as isodops 608 and 610. Therefore, under "no drift" conditions the ΔA signal will correspond to null plane 612 and the ΔB signal will correspond to null plane 614. Thus, under "no drift" conditions, the width of the respective doppler spectrums of the ΔA and ΔB signals will be quite narrow, making it possible to determine aircraft velocity components with high resolution.

However, under aircraft "drift" conditions, as shown in FIG. 3, the ground track no longer coincides with aircraft heading, while the beam components, such as beam 600, 602, 604 and 606 corresponding to each individual one of the four transmitted beams remain in the same position with respect to aircraft heading. Therefore, under "drift" conditions planes physically corresponding to planes 612 and 614 are no longer null planes. Thus, under "drift" conditions, the doppler spectrum of the respective ΔA and ΔB signals will be broad, so that the direct use of the ΔA and ΔB difference signals to determine value of the aircraft velocity components would result in such a determination being of poor resolution.

However, by making the value of θ employed by variable coupler 408 equal to the drift angle α between the ground track and aircraft heading shown in FIGS. 3 and 7, the rotated difference signals ΔA' and ΔB' appearing at the output of variable coupler 408 will in effect be the same as would be obtained by the physical rotation of the beam components 600, 602, 604 and 606 of FIG. 6 through the drift angle α, so that they correspond with beam component 700, 702, 704 and 706 of FIG. 7. Under these conditions, ΔA' corresponds with null plane 712 and ΔB' corresponds with null plane 714. Note that under "no drift" conditions, where drift angle α is zero, FIG. 7 reduces to FIG. 6 and, if the value of θ applied to variable coupler 408 is made equal to a zero drift angle the ΔA' signal becomes exactly equal to the ΔA signal and the ΔB' signal becomes exactly equal to ΔB signal. Thus, under both "no drift" and "drift" conditions the ΔA' and ΔB' signals provide a narrow doppler spectrum, which makes it possible to always determine the aircraft velocity components with high resolution.

In order to automatically cause the angle θ to assume the proper value of the drift angle then existing, the system of FIG. 4 employs servo means. Details of the elements making up this servo means and the manner in which variable coupler 408 is controlled thereby are shown in FIGS. 8, 9, 10 and 11, inclusive.

Referring to FIG. 8, variable coupler 408 may be composed of input sidewall hybrid junction 800, output sidewall hybrid junction 802 and variable phase shifter 804 intercoupled by waveguides. Each of sidewall hybrid junctions 800 and 802 may be similar to model number MA-5004 of Microwave Associates, and variable phase shifter 804 may be similar to model number HP-X885A of Hewlett Packard. Variable phase shifter 804 is normally equipped with a dial for manually turning a rotatable section which includes a diaphragm. However, in the servo means shown in FIG. 8, a servo motor turns the rotatable diaphragm section of phase shifter 804.

As shown in FIG. 8, the input difference signals ΔA and ΔB are applied to the input ports of sidewall hybrid junction 800. One of the output ports of sidewall hybrid junction 800 is coupled directly to an input port of sidewall hybrid junction 802 by waveguide 806, while a second output port of sidewall hybrid junction 800 is coupled to a second input port of sidewall hybrid junction 802 through variable phase shifter 804. The respective values of the output signals ΔA' and ΔB' appearing at the output ports of sidewall hybrid junction 802 depend on the respective values of input difference signals ΔA and ΔB and the angular setting of the rotatable diaphragm section of variable phase shifter 804.

The angular position of the rotatable diaphragm section of variable phase shifter 804 is mechanically varied by servo motor 808, which is driven by an error signal input thereto. This error signal manifests the algebraic difference between the instantaneous value of the signal $\theta + \Delta\theta$ from dither circuit 424 and the signal derived from the wiper of voltage divider 810, which is an analog of the then-existing angular setting of variable phase shifter 804. Specifically, as shown in FIG. 8, voltage divider 810 is energized by voltage source 812 and has its center point connected to a point of reference potential. The wiper of voltage divider 810, which is mechanically driven by the output of servo motor 808, always has a position which corresponds with the angular setting of the rotatable diaphragm section of variable phase shifter 804.

Referring now to FIG. 9, each of comparators 418 and 420, associated respectively with ΔA' and ΔB' outputs of respective phase sensor detectors 414 and 416, includes a +Δθ gate 900 and a −Δθ gate 902. The output from the associated phase sensitive detector is applied as a first input to both +Δθ gate 900 and −Δθ gate 902. Further +Δθ gate 900 and −Δθ gate 902 have the dither-control reference frequency from reference frequency source 422 applied as a second input thereto. +Δθ gate 900 is opened only during each positive half cycle of this reference frequency, while −Δθ gate 902 is opened only during each negative half cycle of this reference frequency.

The output from +Δθ gate 900 is integrated by an integrating circuit comprising resistance 904 bypassed by capacitance 906, while the output from −Δθ gate 902 is integrated by an integrating circuit comprising resistance 908 bypassed by capacitance 910. The magnitude of the integrated signal from +Δθ gate 900 is indicative of the average amplitude of the output from the associated phase sensitive detector which takes place during the +Δθ portion of the dither of variable phase shifter 804. Similarly, the integrated outputs from −Δθ gate 902 is indicative of the average amplitude of the output from the associated phase sensitive detector which takes place during the −Δθ dither of variable phase shifter 804.

The respective integrated outputs +Δθ gate 900 and −Δθ gate 902 are applied as inputs to differential amplifier 912. The output from differential amplifier 912, which is applied as an input to servo amplifier 426 has a polarity and magnitude proportional to the algebraic difference between the respective integrated outputs from +Δθ gate 900 and −Δθ gate 902 applied as inputs thereto.

As shown in FIG. 10, dither circuit 424, which receives both a dc signal having a magnitude and polarity indicative of the then-existing command angle $\theta$ and a small sinusoidal ac signal $\Delta\theta$ from reference frequency source 422, sums this ac dither signal $\Delta\theta$ to the dc command signal $\theta$ by means of transformer 1000. Specifically, the ac signal $\Delta\theta$ is applied to one end of primary winding 1002 of transformer 1000, the other end of primary winding 1002 being connected to a point of reference potential. One end of secondary winding 1004 of transformer 1000 has the dc signal $\theta$ applied thereto and has the other end thereof applied as the command signal input to variable coupler 408. Thus, transformer 1000 serves to provide an output which manifests the sum of the dc signal $\theta$ and the ac signal $\Delta\theta$.

Referring now to FIG. 11, there is shown an embodiment servo amplifier 426 which makes it possible to alternatively develop the servo command signal $\theta$ from either the output of ΔA' comparator 418 or from the output of ΔB' comparator 420. More specifically, ΔA' integrating amplifier 1100 integrates with respect to time the input signal from comparator 418 and algebraically adds this integrated signal to a predetermined dc level $V_{0°}$ (corresponding to a value of $\theta$ of 0°) to provide an output $\theta_{A'}$. This output signal $\theta_{A'}$, referenced to $V_{0°}$, is employed as the output command signal $\theta$, applied to dither circuit 424 and block 417, only when ΔA' gate 1102 is open.

ΔB' integrating amplifier 1104 integrates the signal from ΔB' comparator 420 applied as an input thereto. The output from ΔB' integrating amplifier 1104 is added to a dc reference level $V_{90°}$ (corresponding to a value of $\theta = 90°$) to provide $\theta_{\Delta B'}$. This output signal $\theta_{\Delta B'}$ referenced to $V_{90°}$ is employed as the output command signal $\theta$, applied to dither circuit 424 and block 417, only when ΔB' gate 1106 is open.

ΔA' gate 1102 is opened only while the absolute magnitude of the output from ΔA' comparator 418 is larger than the absolute magnitude of the output from ΔB' comparator 420. Similarly ΔB' gate 1106 is opened only while the absolute magnitude from ΔB' comparator 420 is larger than the absolute magnitude of the output from ΔA' comparator 418. This is accomplished by applying the output from ΔA' comparator 418 to ΔA'² circuit 1108, which provides an output level which is a measure of the magnitude of the input thereto from ΔA' comparator 418, but is independent of the polarity of this input. In a similar manner, ΔB'² circuit 1110 provides an output level which is a measure of the magnitude of the input thereto from ΔB' comparator 420, but is independent of the polarity of this input.

Subtracter 1112, which has the outputs from ΔA'² circuit 1108 and ΔB'² 1110 applied at inputs thereto, produces a positive output when the magnitude from ΔA'² circuit 1108 is larger than that from ΔB'² circuit 1110. This positive output from subtractor 1112 is effective in opening ΔA' gate 1102. Similarly, when the output level from ΔB'² circuit 1110 is larger than the output level from ΔA'² circuit 1108, the polarity of output from subtractor 1112 is negative. This negative output from subtracter 1112 is effective in opening ΔB' gate 1106.

In order to understand the purpose of the arrangement for servo amplifier 426 shown in FIG. 11, it must be remembered that the ΔA' and ΔB' signals are not independent of each other, but represent respective quadrature components. In the usual case, when the aircraft is in straight-line flight and the drift angle is smaller than 45°, the absolute magnitude of the input from ΔA' comparator 418 to servo amplifier 426 is larger than the absolute magnitude of the input thereto from ΔB' comparator 420. The reason for this is that the sensitivity to dither is a maximum about axis 712 of FIG. 7 (perpendicular to the ground track of the aircraft) and is a minimum about axis 714 of FIG. 7 (along the ground track itself). Under the assumed conditions, where the aircraft is in straight-line flight and the drift angle is less than 45°, the ΔA' signal corresponds more closely to axis 712 than the axis 714, while the ΔB' signal corresponds more closely to axis 714 than axis 712.

However, an aircraft does encounter conditions during yawing (when it is not in straight-line flight) and/or during very high drift angles of more than 45°, when the ΔA' signal corresponds more closely with ground track axis 714 than it does with axis 712 and the ΔB' signal corresponds more closely with axis 712 than it does with ground track axis 714. Under these latter circumstances, the absolute magnitude of the signal from ΔB' comparator 420 is greater than the absolute magnitude of the signal from ΔA' comparator 418. Servo amplifier 426, by deriving this output signal Δ from that one of comparators 418 and 420 having, at that moment of time, the largest absolute magnitude, results in maximizing the sensitivity and response time of the servo loop, which controls the adjustment of the rotatable diagram section of variable phase shifter 804 of variable coupler 408.

Variable coupler 408 and the servo means for controlling it may take other forms than specifically shown in FIGS. 8, 9, 10 and 11. For instance, rather than being mechanical, variable phase shifter 408 may be a coaxial transmission line filter with varactor diodes incorporated into the reactive element at variable capacitors, the capacitance being a function of an applied voltage corresponding to $\theta + \Delta\theta$, or, in the alternative, phase shifter 408 could be a waveguide section partially loaded with ferrite material and surrounded by a solenoid so that the magnetic flux within the ferrite could be varied by means of current applied to the solenoid in accordance with a signal manifesting the angle $\theta + \Delta\theta$.

In any event, it is not intended that the invention be limited to the specific arrangements shown in FIGS. 8, 9, 10 and 11, but that it include any structural type of variable coupler and servo means for controlling it which are within the skill of the art.

Returning now to FIG. 4, velocity data processor and display 417, in response to the data applied thereto from all four beam channels and from aircraft attitude sensors which manifest the roll, pitch and yaw of the aircraft, is capable of computing the various velocity components of the aircraft with respect to the ground and for displaying any or all of these to the pilot. Velocity data processors and displays of this type are well known in the art of conventional doppler aircraft ground velocity radars, and form, per se, no part of the present invention.

In the disclosed embodiment, the transformation functions for effectively rotating the monopulse beam components about the antenna axis are obtained with a variable coupler, which is an analog device. As is known in the art, digital devices may be substituted for analog devices to perform the same functions. Further, although not necessarily desirable, it is possible to actually physically rotate the monopulse antenna about its axis. This may be accomplished with or without servo means. It is intended that the present invention cover all means of actually or effectively rotating the beam components of a monopulse antenna about the antenna axis, whether for the purpose of providing an improved aircraft ground velocity doppler radar or for other purposes. Therefore, the scope of the present invention is not limited to the preferred embodiment thereof disclosed herein, but encompasses any monopulse radar system including antenna axis-rotating means which at least in its effect rotates a set of monopulse beam components disposed substantially symmetrically about a monopulse antenna axis through any given angle about this antenna axis.

What is claimed is:

1. In a monopulse radar system comprising fixedly-mounted antenna means having a given axis for simultaneously picking up a respective signal from each member of a set of discrete spaced electromagnetic beam components disposed substantially symmetrically about said axis, and means coupled to said antenna means for utilizing predetermined sum and difference signals of said respective picked-up signals; the improvement wherein said system includes axis-rotating means coupled to said utilizing means which in effect rotates said set of beam components about said axis through any given angle by combining certain of said signals in accordance with predetermined transformation functions of said given angle to obtain the effect of rotation of said axis through said given angle, wherein said set includes four beam components spatially distributed about said axis in the form of a square, whereby the position of each beam component corresponds with a different vertex of said square with the vertices corresponding to first and second ones of said beam components defining a first side of said square, and vertices corresponding to third and fourth ones of said beam components defining a second side of said square, the vertices corresponding to said first and third ones of said beam components defining a third side of said square, and the vertices corresponding to said second and fourth ones of said beam components defining a fourth side of said square; wherein said utilization means includes means for deriving a summation signal equal to the sum of the picked-up signals of all said four beam components, a first difference signal equal to the difference between the sum of picked-up signals of said first and second beam components and the sum of picked-up signals of said third and fourth beam components, and a second difference signal equal to the difference between the sum of the picked-up signals of said first and third beam components and the sum of the picked-up signals of said second and fourth beam components, and wherein said transformation functions are defined by the following formula:

1 $\Delta A' = \Delta A \cos - \Delta B \sin\theta$
2 $\Delta B' = \Delta B \sin + \Delta B \cos\theta$;

where ΔA is said first difference signal, ΔB is said second difference signal, θ is said given angle of rotation; ΔA' is a rotated first difference signal and ΔB' is a rotated second difference signal.

2. In a doppler radar system aboard an aircraft of the type employing at least three non-coplanar beam antennas directed towards the ground for receiving return signals from the ground in response to transmitted radar signals and means responsive to said return signals for determining the velocity components of said aircraft with respect to the ground; the improvement wherein said antennas are fixedly mounted, non-track stabilized monopulse antennas having given respective axes with respect to said aircraft, each monopulse antenna simultaneously picking up a respective signal from each member of a set of discrete spaced beam components disposed substantially symmetrically about that antenna's axis, and wherein said system includes axis-rotating means for each of said antennas responsive to said signals picked-up by that antenna which without any mechanical movement of said fixedly mounted, non-track stabilized monopulse antennas in effect rotates its set about its axis to maintain substantially constant at a predetermined value the angular orientation of its set with respect to an isodop on the ground.

3. The system defined in claim 2, wherein said axis-rotating means for each of said antennas comprises a variable coupler having a first difference signal of said picked-up signals applied as a first input thereto, a second difference signal of said picked-up signals applied as a second input thereto and an angle-representing signal applied as a third input thereto for deriving respective first and second output signals with respective first and second predetermined angle-rotation transformation functions of said three input signals, and doppler receiver means including angle-control servo means responsive to the relative doppler shift between said first and second output signals for controlling said angle-representing signal to cause said relative doppler shift to have substantially that given value at which said angle-representing signal represents said predetermined value of angular orientation.

4. The system defined in claim 3, wherein said doppler receiver means includes detector means for deriving respective first and second normalized signals each manifesting a different one of first and second quadrature components of doppler shift with respect to the angular orientation then being represented by said angle-representing signals, and wherein said servo means includes a servo amplifier and a dither circuit for deriving as said angle-representing signal a signal having an instantaneous value which oscillates an incremental amount about a mean value determined by the output of said servo amplifier at a rate determined by the frequency of a timing signal applied to said dither circuit, first and second comparators for respectively comparing each of said first and second quadrature components with said timing signal to derive respective output signals therefrom, said output signals of said first and second comparators being applied as input to said servo amplifier which in response to the difference in value existing therebetween varies the value of the output thereof in a direction which reduces this difference to a minimum.

* * * * *